US007671138B2

(12) United States Patent
Luo (10) Patent No.: US 7,671,138 B2
(45) Date of Patent: Mar. 2, 2010

(54) POLYMERS FUNCTIONIZED WITH HYDROBENZAMIDES

(75) Inventor: Steven Luo, Copley, OH (US)

(73) Assignee: Bridgestone Corporation (JP)

( * ) Notice: Subject to any disclaimer, the term of this patent is extended or adjusted under 35 U.S.C. 154(b) by 392 days.

(21) Appl. No.: 11/710,713

(22) Filed: Feb. 26, 2007

(65) Prior Publication Data
US 2007/0276122 A1 Nov. 29, 2007

Related U.S. Application Data

(63) Continuation-in-part of application No. 11/441,850, filed on May 26, 2006.

(51) Int. Cl.
C08C 19/22 (2006.01)
C08F 8/30 (2006.01)
(52) U.S. Cl. .............. 525/374; 525/333.6; 525/332.8; 525/332.9; 525/333.1; 525/333.2; 526/329.1
(58) Field of Classification Search .......... 526/329.1; 525/333.6, 374, 332.8, 332.9, 333.1, 333.2
See application file for complete search history.

(56) References Cited

U.S. PATENT DOCUMENTS

| 1,223,396 A | 4/1917 | Karlsson |
| 2,227,957 A | 1/1941 | Brasse |
| 3,297,667 A | 1/1967 | Von Dohlen et al. ....... 260/82.1 |
| 3,541,063 A | 11/1970 | Throckmorton et al. .... 260/82.1 |
| 3,794,604 A | 2/1974 | Throckmorton et al. ..... 252/431 |
| 4,185,042 A | 1/1980 | Verkouw ..................... 525/332 |
| 4,461,883 A | 7/1984 | Takeuchi et al. ............ 526/139 |
| 4,751,275 A | 6/1988 | Witte et al. ................. 526/139 |
| 4,791,174 A * | 12/1988 | Bronstert et al. ............ 525/274 |
| 4,906,706 A | 3/1990 | Hattori et al. ............... 525/343 |
| 4,990,573 A | 2/1991 | Andreussi et al. ........ 525/332.3 |
| 5,064,910 A | 11/1991 | Hattori et al. ............ 525/359.1 |
| 5,066,729 A | 11/1991 | Stayer et al. ................ 525/332 |
| 5,109,907 A | 5/1992 | Stayer et al. ................ 152/654 |
| 5,227,431 A | 7/1993 | Lawson et al. .............. 525/237 |
| 5,310,798 A * | 5/1994 | Lawson et al. .............. 525/102 |
| 5,508,333 A | 4/1996 | Shimizu ..................... 524/424 |
| 5,567,784 A | 10/1996 | Wieder et al. ............... 526/164 |
| 5,844,050 A | 12/1998 | Fukahori et al. ............ 525/351 |
| 5,866,171 A | 2/1999 | Kata .......................... 425/46 |
| 5,866,650 A | 2/1999 | Lawson et al. .............. 524/572 |
| 5,876,527 A | 3/1999 | Tsuruta et al. .............. 152/541 |
| 5,916,961 A | 6/1999 | Hergenrother et al. ...... 524/572 |
| 5,931,211 A | 8/1999 | Tamura ................... 152/209.5 |
| 5,971,046 A | 10/1999 | Koch et al. ............... 152/152.1 |
| 6,117,927 A | 9/2000 | Toba et al. .................. 524/261 |
| 6,172,160 B1 | 1/2001 | Nakamura et al. |
| 6,194,505 B1 | 2/2001 | Sone et al. ................. 524/432 |
| 6,197,888 B1 | 3/2001 | Luo .......................... 525/247 |
| 6,255,416 B1 | 7/2001 | Sone et al. ................. 526/153 |
| 6,291,591 B1 | 9/2001 | Luo .......................... 525/191 |
| 6,303,692 B1 | 10/2001 | Luo .......................... 525/191 |
| 6,699,813 B2 | 3/2004 | Luo et al. ................... 502/119 |
| 6,759,497 B2 | 7/2004 | Grun et al. |
| 6,838,526 B1 | 1/2005 | Sone et al. |
| 6,897,270 B2 | 5/2005 | Ozawa et al. ................. 526/88 |
| 6,977,281 B1 * | 12/2005 | Ozawa et al. ............... 525/377 |
| 6,992,147 B1 | 1/2006 | Ozawa et al. ............... 525/342 |
| 7,008,899 B2 | 3/2006 | Luo et al. ................... 502/131 |
| 7,094,849 B2 | 8/2006 | Luo et al. ................... 526/164 |
| 7,351,776 B2 | 4/2008 | Tartamella et al. |
| 2004/0147694 A1 | 7/2004 | Sone et al. .................. 526/164 |
| 2006/0004131 A1 | 1/2006 | Ozawa et al. ............... 525/342 |
| 2006/0025539 A1 | 2/2006 | Ozawa et al. ............... 525/377 |
| 2006/0030677 A1 | 2/2006 | Ozawa et al. ............... 525/342 |
| 2007/0149717 A1 * | 6/2007 | Luo et al. ................. 525/331.9 |

FOREIGN PATENT DOCUMENTS

| DE | 138 070 | 10/1979 |
| EP | 0 767 179 | 4/1997 |
| EP | 0 713 885 | 5/1998 |
| EP | 0 863 165 | 9/1998 |
| EP | 0 894 825 | 2/1999 |
| EP | 0 920 886 | 6/1999 |
| EP | 0 957 115 | 11/1999 |
| EP | 1 099 711 | 11/1999 |
| GB | 835752 | 7/1956 |
| JP | 05-051406 A | 3/1993 |
| JP | 05-059103 A | 3/1993 |
| JP | 10-306113 A | 11/1998 |
| JP | 11-035633 A | 2/1999 |
| WO | 95/04090 | 2/1995 |

(Continued)

OTHER PUBLICATIONS

"Chemical Modification of Neodymium High cis-1,4-Polybutadiene with Styreneoxide" by Hattori et al., J. Elastomers and Plastics, Issue 23, 135, 1991.

(Continued)

Primary Examiner—Ling-Siu Choi
(74) Attorney, Agent, or Firm—Meredith E. Hooker; Arthur Reginelli (57) ABSTRACT

A method for preparing a functionalized polymer, the method comprising the steps of (i) polymerizing conjugated diene monomer by employing a lanthanide-based catalyst to form a reactive polymer, and (ii) reacting the reactive polymer with a hydrobenzamide compound.

16 Claims, 1 Drawing Sheet

FOREIGN PATENT DOCUMENTS

| | | |
|---|---|---|
| WO | 01/34659 | 11/2000 |
| WO | 02/38615 | 11/2000 |

OTHER PUBLICATIONS

"Functionalization with Styreneoxide" by Hattori et al., Polym. Adv. Techol., Issue 4, 450 1993.

Z. Shen, J. Ouyang, F. Wang, Z. Hu, F. Yu, and B. Qian, Journal of Polymer Science: Polymer Chemistry Edition, 1980, vol. 18, pp. 3345-3357.

H.L. Hsieh, H.C. Yeh, Rubber Chemistry and Technology, 1985, vol. 58, pp. 117-145.

D.J. Wilson, Journal of Polymer Science, Part A, Polymer Chemistry, 1995, vol. 33, pp. 2505-2513.

R.P. Quirk, A.M. Kells, Poymer International, 2002 vol. 49, pp. 751-756.

* cited by examiner

POLYMERS FUNCTIONIZED WITH HYDROBENZAMIDES

This application is a continuation-in-part application of U.S. patent application Ser. No. 11/441,850, filed on May 26, 2006, which is incorporated herein by reference.

FIELD OF THE INVENTION

One or more embodiments of the present invention relates to functionalized polymers and methods for their manufacture.

BACKGROUND OF THE INVENTION

Lanthanide-based catalyst systems may be useful for producing conjugated diene polymers having high cis-1,4-linkage contents. The cis-1,4-polydienes prepared by using lanthanide-based catalysts may display pseudo-living characteristics in that, upon completion of the polymerization, some of the polymer chains may possess reactive ends.

SUMMARY OF THE INVENTION

In one or more embodiments, the present invention includes a method for preparing a functionalized polymer, the method comprising the steps of (i) polymerizing conjugated diene monomer by employing a lanthanide-based catalyst to form a reactive polymer, and (ii) reacting the reactive polymer with a hydrobenzamide compound.

In one or more embodiments, the present invention further includes a functionalized polymer prepared by a method comprising the steps of (i) polymerizing conjugated diene monomer by employing a lanthanide-based catalyst to form a reactive polymer, and (ii) reacting the reactive polymer with a hydrobenzamide compound.

BRIEF DESCRIPTION OF THE DRAWINGS

The FIG. 1 is a graph showing tan δ as a function of Mooney viscosity of uncured rubber compound.

DETAILED DESCRIPTION OF ILLUSTRATIVE EMBODIMENTS

According to one or more embodiments of the present invention, conjugated diene monomer can be polymerized with a lanthanide-based catalyst system to form a pseudo-living polymer, and this polymer can then be functionalized by reaction with a hydrobenzamide compound. The resultant functionalized polymer can be used in the manufacture of tire components.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e. a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers, may be employed in addition to the ingredients or components set forth above. For example, in one embodiment, a nickel-containing compound may be employed as a molecular weight regulator as disclosed in U.S. Pat. No. 6,699,813, which is incorporated herein by reference.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl)phosphate, neodymium (1-methylheptyl) (2-ethylhexyl)phosphate, and neodymium (2-ethylhexyl) (p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl) phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium (1-methylheptyl) (2-ethylhexyl)phosphinate, and neodymium (2-ethylhexyl) (p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound. A Lewis base such as tetrahydrofuran (THF) may be employed as an aid for solubilizing this class of neodymium compounds in inert organic solvents.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

and oligomeric cyclic aluminoxanes that can be represented by the general formula:

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methyl aluminoxane and at least one other organoaluminum compound (e.g., $AlR_nX_{3-n}$) such as diisobutylaluminum hydride are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but are not limited to, nitrogen, oxygen, silicon, sulfur, and phosphorus atom.

Examples of suitable dihydrocarbylmagnesium compounds utilized include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that can be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, metallic halides, organometallic halides, and mixtures thereof.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Compounds containing non-coordinating anions are known in the art. In general, non-coordinating anions are sterically bulky anions that do not form coordinate bonds with, for example, the active center of a catalyst system, due to steric hindrance. Exemplary non-coordinating anions include tetraarylborate anions, and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The foregoing catalyst compositions may have high catalytic activity for polymerizing conjugated dienes into stereospecific polydienes over a wide range of catalyst concentrations and catalyst ingredient ratios. It is believed that the catalyst ingredients may interact to form an active catalyst species. It is also believed that the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from about 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The catalyst composition may be formed by combining or mixing the catalyst ingredients. Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by various methods.

In one embodiment, the catalyst composition may be formed in situ by adding the catalyst ingredients to a solution containing monomer and solvent, or simply bulk monomer, in either a stepwise or simultaneous manner. In one embodiment, the alkylating agent can be added first, followed by the lanthanide compound, and then followed by the halogen-containing compound, if used, or by the compound containing a non-coordinating anion or the non-coordinating anion precursor.

In another embodiment, the catalyst ingredients may be pre-mixed outside the polymerization system at an appropriate temperature, which may be from about −20° C. to about 80° C., and the resulting catalyst composition may be aged for a period of time ranging from a few minutes to a few days and then added to the monomer solution.

In yet another embodiment, the catalyst composition may be pre-formed in the presence of at least one conjugated diene monomer. That is, the catalyst ingredients may be pre-mixed in the presence of a small amount of conjugated diene monomer at an appropriate temperature, which is may be from about −20° C. to about 80° C. The amount of conjugated diene monomer that may be used for pre-forming the catalyst can range from about 1 to about 500 moles per mole, in other embodiments from about 5 to about 250 moles per mole, and in other embodiments from about 10 to about 100 moles per mole of the lanthanide compound. The resulting catalyst composition may be aged for a period of time ranging from a few minutes to a few days and then added to the remainder of the conjugated diene monomer that is to be polymerized.

And in yet another embodiment, the catalyst composition may be formed by using a two-stage procedure. The first stage may involve combining the alkylating agent with the lanthanide compound in the absence of conjugated diene monomer or in the presence of a small amount of conjugated diene monomer at an appropriate temperature, which may be from about −20° C. to about 80° C. In the second stage, the foregoing reaction mixture and the halogen-containing compound, non-coordinating anion, or non-coordinating anion precursor can be charged in either a stepwise or simultaneous manner to the remainder of the conjugated diene monomer that is to be polymerized.

When a solution of the catalyst composition or one or more of the catalyst ingredients is prepared outside the polymerization system as set forth in the foregoing methods, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used.

The production of polymer can be accomplished by polymerizing conjugated diene monomer in the presence of a catalytically effective amount of the foregoing catalyst composition. The total catalyst concentration to be employed in the polymerization mass may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

The polymerization can be carried out in an organic solvent as the diluent. In one embodiment, a solution polymerization system can be employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized may be in a condensed phase. Also, the catalyst ingredients may be solubilized or suspended within the organic solvent. In these or other embodiments, the catalyst ingredients or components are unsupported or not impregnated onto a catalyst support. In other embodiments, the catalyst ingredients or components may be supported.

In performing these polymerizations, an amount of organic solvent in addition to the amount of organic solvent that may be used in preparing the catalyst composition may be added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can be in a range of from about 3% to about 80% by weight, in other embodiments from about 5% to about 50% by weight, and in other embodiments from about 10% to about 30% by weight.

The polymerization of conjugated dienes may also be carried out by means of bulk polymerization, which refers to a polymerization environment where substantially no solvents are employed. The bulk polymerization can be conducted either in a condensed liquid phase or in a gas phase.

The polymerization of conjugated dienes may be carried out as a batch process, a continuous process, or a semi-continuous process. In the semi-continuous process, monomer may be intermittently charged as needed to replace that monomer already polymerized. In any case, the polymerization may be conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above. In one embodiment, the polymerization temperature may be from about 20° C. to about 90° C. The heat of polymerization may be removed by external cooling (e.g., with a thermally controlled reactor jacket), internal cooling (e.g., by evaporation and condensation of the monomer or the solvent through the use of a reflux condenser connected to the reactor), or a combination of the methods. Although the polymerization pressure employed may vary widely, a pressure range of from about 1 atmosphere to about 10 atmospheres may be maintained.

The polymers prepared by employing the lanthanide-based catalyst compositions of one or more embodiments of the present invention may include reactive chain ends before the polymerization mixture is quenched. These reactive polymers, which may be referred to as pseudo-living polymers, can be reacted with hydrobenzamide compounds or mixtures thereof to form functionalized polymers.

In one or more embodiments, hydrobenzamides can be defined by the formula where each φ is independently an aryl group.

In one or more embodiments, hydrobenzamide compounds may be prepared by the condensation reaction between ammonia and aromatic aldehydes as illustrated by the following equation:

Typically, three moles of aromatic aldehyde react with two moles of ammonia to form a condensation product, which is the hydrobenzamide. The three moles of aromatic aldehyde may be the same or different.

The hydrobenzamide resulting from the reaction between ammonia and benzaldehyde is often simply called hydrobenzamide. However, as used in this specification, the term hydrobenzamide refers to the condensation product of ammonia and any aromatic aldehyde without being limited to the product formed from benzaldehyde; the hydrobenzamide deriving from benzaldehyde can be referred to as benzaldehyde hydrobenzamide, as discussed herein below.

In one or more embodiments, aryl groups include phenyl, substituted phenyl, biphenyl, substituted biphenyl, heterocyclic aryl, substituted heterocyclic aryl, bicyclic aryl, substituted bicyclic aryl, polycyclic aryl, and substituted polycyclic aryl groups. Substituted aryl groups include those where a hydrogen atom is replaced by a monovalent organic group such as a hydrocarbyl group. Hydrocarbyl groups include alkyl, cycloalkyl, substituted cycloalkyl, alkenyl, cycloalkenyl, substituted cycloalkenyl, aryl, allyl, substituted aryl, aralkyl, alkaryl, and alkynyl groups; these groups may include from 1 carbon atom, or the appropriate minimum number of carbon atoms to form the group, up to 20 carbon atoms. Hydrocarbyl groups may include heteroatoms such as nitrogen, sulfur, boron, oxygen, silicon, and phosphorus.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl).

Exemplary heterocyclic aryl groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, and 2-triazinyl groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl.

In naming specific exemplary hydrobenzamides, more than one naming method may be employed. One method employs the name of the aromatic aldehyde from which the hydrobenzamide derives. For example, and as noted above, the hydrobenzamide deriving from benzaldehyde may be referred to as benzaldehyde hydrobenzamide. Other examples include 1-naphthaldehyde hydrobenzamide, 2-naphthaldehyde hydrobenzamide, 9-anthracenecarboxaldehyde hydrobenzamide, 9-phenanthrenecarboxaldehyde hydrobenzamide, 2-pyridinecarboxaldehyde hydrobenzamide, 3-furancarboxaldehyde hydrobenzamide, N-methyl-4-pyrazolecarboxaldehyde hydrobenzamide, N-methyl-2-pyrrolecarboxaldehyde hydrobenzamide, N-methyl-2-imidazolecarboxaldehyde hydrobenzamide, N-methyl-indole-3-carboxaldehyde hydrobenzamide, N-methyl-1,2,3-triazole-4-carboxaldehyde hydrobenzamide, N-methyl-1,2,4-triazole-3-carboxaldehyde hydrobenzamide, 2-furancarboxaldehyde hydrobenzamide, pyrhydrobenzamidecarboxaldehyde hydrobenzamide, 2-thiazolecarboxaldehyde hydrobenzamide, 2-thiophenecarboxaldehyde hydrobenzamide, 2-methylbenzaldehyde hydrobenzamide, 2,3-dimethylbenzaldehyde hydrobenzamide, 2,4,6-trimethylbenzaldehyde hydrobenzamide, 2-thianthrenecarboxaldehyde hydrobenzamide, 1-isobenzofuranecarboxaldehyde hydrobenzamide, N-methyl-2-indolecarboxaldehyde hydrobenzamide, N-methyl-8-purinecarboxaldehyde hydrobenzamide, isothiazolecarboxaldehyde hydrobenzamide, 3-isoxazolecarboxaldehyde hydrobenzamide, and mixtures thereof.

Alternatively, hydrobenzamides may be named according to the IUPAC convention. For example, benzaldehyde hydrobenzamide may be referred to as phenyl-N,N-bis(benzylidene)methanediamine. And, 2-thiophenecarboxaldehyde hydrobenzamide may be referred to as 2-thienyl-N,N-bis(2-thienylmethylene)methanediamine.

In one or more embodiments, the pseudo-living polymer and the hydrobenzamide compound can be reacted by combining or mixing them in the same medium that the pseudo-living polymer is prepared or stored. For example, where the pseudo-living polymer is synthesized in solution, the hydrobenzamide compound can be added to the solution containing the pseudo-living polymer. In one or more embodiments, the hydrobenzamide compound can be reacted with the pseudo-living polymer before the pseudo-living polymer is quenched. In one or more embodiments, the reaction between the hydrobenzamide compound and the pseudo-living polymer may take place within 30 minutes, in other embodiments within 5 minutes, and in other embodiments within one minute of reaching the peak polymerization temperature resulting from the synthesis of the pseudo-living polymer. In one or more embodiments, the reaction between the pseudo-living polymer and the hydrobenzamide compound can occur at the peak polymerization temperature. In other embodiments, the reaction between the pseudo-living polymer and the hydrobenzamide compound can occur after the pseudo-living polymer has been stored. In one or more embodiments, the storage of the pseudo-living polymer occurs at room temperature or below under an inert atmosphere. In one or more embodiments, the reaction between the hydrobenzamide compound and the pseudo-living polymer may take place at a temperature from about 10° C. to about 150° C., and in other embodiments from about 20° C. to about 100° C.

The amount of the hydrobenzamide compound that can be reacted with the pseudo-living polymer may vary depending on the desired degree of functionalization. In one or more embodiments, the amount of the hydrobenzamide compound employed can be described with reference to the lanthanide metal of the lanthanide compound. For example, the molar ratio of the hydrobenzamide compound to the lanthanide metal may be from about 1:1 to about 200:1, in other embodiments from about 5:1 to about 150:1, and in other embodiments from about 10:1 to about 100:1.

In one or more embodiments, after the reaction between the pseudo-living polymer and the hydrobenzamide compound has been accomplished or completed, a quenching agent can be added to the polymerization mixture in order to inactivate any residual reactive polymer chains and the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

Where 1,3-butadiene is polymerized, the number average molecular weight ($M_n$) of the polybutadiene may be from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for polybutadiene. The polydispersity of the polymer may be from about 1.5 to about 5.0, and in other embodiments from about 2.0 to about 4.0.

Where cis-1,4-polydienes are prepared, they can have a cis-1,4-linkage content that is greater than about 60%, in other embodiments greater than about 75%, in other embodiments greater than about 90%, and in other embodiments greater than about 95%. Also, these polymers may have a 1,2-linkage content that is less than about 7%, in other embodiments less than 5%, in other embodiments less than 2%, and in other embodiments less than 1%. The cis-1,4- and 1,2-linkage contents can be determined by infrared spectroscopy.

The functionalized polymers of this invention are particularly useful in preparing tire components. These tire components can be prepared by using the functionalized polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery polymers may derive from the polymerization of ethylene together with one or more $\alpha$-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functional polymers are employed in tread formulations. In one or more embodiments, these tread formulations may include from about 10% to about 100% by weight, in other embodiments from about 35% to about 90% by weight, and in other embodiments from about 50% to 80% by weight of the functional polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in *The Compounding and Vulcanization of Rubber, in Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

Synthesis of Unmodified cis-1,4-Polybutadiene (Control Polymer)

To a 2-gallon reactor equipped with turbine agitator blades was added 1616 g of hexane and 2900 g of 21.9 wt % butadiene in hexane. A preformed catalyst was prepared by mixing 7.35 ml of 4.32 M methylaluminoxane in toluene, 1.56 g of 21.9 wt % 1,3-butadiene in hexane, 0.59 ml of 0.537 M neodymium versatate in cyclohexane, 6.67 ml of 1.0 M diisobutylaluminum hydride in hexane, and 1.27 ml of 1.0 M diethylaluminum chloride in hexane. The catalyst was aged for 15 minutes and charged into the reactor. The reactor jacket temperature was then set to 65° C. Sixty five minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The Mooney viscosity ($ML_{1+4}$) of the polymer was determined to be 27.9 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 119,700, a weight average molecular weight ($M_w$) of 210,900, and a molecular weight distribution ($M_w/M_n$) of 1.76. The infrared spectroscopic analysis of the polymer indicated a cis-1,4-linkage content of 94.5%, a trans-1,4-linkage content of 5.0%, and a 1,2-linkage content of 0.5%.

Example 2

Synthesis of Unmodified cis-1,4-Polybutadiene (Control Polymer)

To a 2-gallon reactor equipped with turbine agitator blades was added 1651 g of hexane and 2835 g of 22.4 wt % butadiene in hexane. A preformed catalyst was prepared by mixing 5.88 ml of 4.32 M methylaluminoxane in toluene, 1.22 g of 22.4 wt % 1,3-butadiene in hexane, 0.47 ml of 0.537 M neodymium versatate in cyclohexane, 5.33 ml of 1.0 M diisobutylaluminum hydride in hexane, and 1.02 ml of 1.0 M diethylaluminum chloride in hexane. The catalyst was aged for 15 minutes and charged into the reactor. The reactor jacket temperature was then set to 65° C. Seventy minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The resulting polymer had the following properties: $ML_{1+4}$=44.2, $M_n$=129,900, $M_w$=261,200, $M_w/M_n$=2.01, cis-1,4-linkage=95.0%, trans-1,4-linkage=4.5%, and 1,2-linkage=0.5%.

Example 3

Synthesis of cis-1,4-Polybutadiene Modified with Benzaldehyde Hydrobenzamide (HBA)

To a 2-gallon reactor equipped with turbine agitator blades was added 1616 g of hexane and 2900 g of 21.9 wt % butadiene in hexane. A preformed catalyst was prepared by mixing 8.82 ml of 4.32 M methylaluminoxane in toluene, 1.88 g of 21.9 wt % 1,3-butadiene in hexane, 0.71 ml of 0.537 M neodymium versatate in cyclohexane, 8.00 ml of 1.0 M diisobutylaluminum hydride in hexane, and 1.52 ml of 1.0 M diethylaluminum chloride in hexane. The catalyst was aged for 15 minutes and charged into the reactor. The reactor jacket temperature was then set to 65° C. Seventy one minutes after addition of the catalyst, the polymerization mixture was cooled to room temperature. 423 g of the resulting living polymer cement was transferred from the reactor to a nitrogen-purged bottle, followed by addition of 5.35 ml of 0.40 M benzaldehyde hydrobenzamide (also commonly referred to as hydrobenzamide or HBA) in toluene. The bottle was tumbled for 40 minutes in a water bath maintained at 65° C. The resulting mixture was coagulated with 3 liters of isopropanol containing 0.5 g of 2,6-di-tert-butyl-4-methylphenol and then drum-dried to give a modified polymer that had the following properties: $ML_{1+4}$=23.4, $M_n$=110,700, $M_w$=197,400, $M_w/M_n$=1.78, cis-1,4-linkage=94.3%, trans-1,4-linkage=5.2%, and 1,2-linkage=0.5%.

The GPC charts of unmodified polymer (Examples 1 and 2) and HBA-modified polymer (Example 3) were obtained by a GPC instrument equipped with a differential refractive index (RI) detector and an ultraviolet (UV) absorption detector. The unmodified polymer prepared in Examples 1 and 2 show essentially no UV absorption. In contrast, the HBA-modified polymer prepared in Examples 3 show very strong UV absorption, indicating that the polymer chain ends contain UV-active functional groups derived from HBA.

Examples 4-6

Compounding Evaluation of HBA-Modified Polymer vs. Unmodified Polymer

The polymer samples produced in Examples 1-3 were evaluated in a carbon black filled rubber compound. The compositions of the vulcanizates are presented in Table 1; the numbers in the table are expressed as parts per hundred parts by weight of rubber (phr).

TABLE 1

Compositions of Rubber Vulcanizates*

| | Example No. | | |
|---|---|---|---|
| | Example 4 | Example 5 | Example 6 |
| Polymer used | Example 1 | Example 2 | Example 3 |
| Polymer type | unmodified | unmodified | HBA-modifled |
| Polymer | 80 | 80 | 80 |
| Polyisoprene | 20 | 20 | 20 |
| Carbon black | 50 | 50 | 50 |
| Oil | 10 | 10 | 10 |
| Wax | 2 | 2 | 2 |
| Antioxidant | 1 | 1 | 1 |
| Zinc oxide | 2.5 | 2.5 | 2.5 |
| Stearic acid | 2 | 2 | 2 |
| Accelerators | 1.3 | 1.3 | 1.3 |
| Sulfur | 1.5 | 1.5 | 1.5 |
| Total | 170.3 | 170.3 | 170.3 |

The Mooney viscosity ($ML_{1+4}$) of the uncured compound was determined at 130° C. by using a Alpha Technologies Mooney viscometer with a large rotor, a one-minute warm-up time, and a four-minute running time. The tensile mechanical properties of the vulcanizates were measured by using the standard procedure described in ASTM-D412. The Payne effect data ($\Delta G'$) and hysteresis data (tan $\delta$) of the vulcanizates were obtained from a dynamic strain sweep experiment, which was conducted at 50° C. and 1 Hz with strain sweeping from 0.25% to 14%. $\Delta G'$ is the difference between G' at 0.25% strain and G' at 14% strain. The physical properties of the vulcanizates are summarized in Table 2 and FIG. 1.

TABLE 2

Physical Properties of Rubber Vulcanizates

| | Example No. | | |
|---|---|---|---|
| | Example 4 | Example 5 | Example 6 |
| Polymer type | unmodified | unmodified | HBA-modified |
| Compound ML at 130° C. | 53.0 | 67.4 | 58.1 |
| 300% Modulus at 23° C. | 8.77 | 8.67 | 9.98 |
| $T_b$ at 23° C. (MPa) | 12.6 | 15.0 | 11.6 |
| $E_b$ at 23° C. (%) | 384 | 429 | 331 |
| $\Delta G'$ (MPa) | 1.87 | 1.42 | 1.04 |
| tan $\delta$ at 50° C., 3% strain | 0.138 | 0.124 | 0.0962 |

Figure 1:
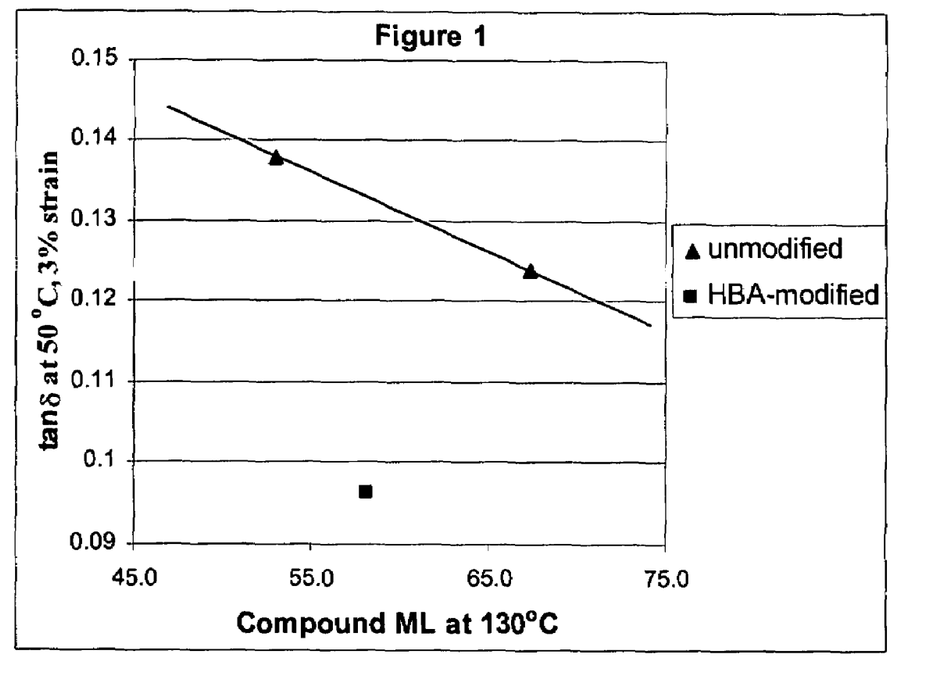

As can be seen in Table 2 and FIG. 1, the HBA-modified polymer shows lower tan $\delta$ at 50° C. than the unmodified polymer, indicating that HBA modification of the polymer

What is claimed is:

1. A method for preparing a functionalized polymer, the method comprising the steps of:
   (i) polymerizing conjugated diene monomer by employing a lanthanide-based catalyst to form a reactive polymer; and
   (ii) reacting the reactive polymer with a hydrobenzamide compound.

2. The method of claim 1, where the hydrobenzamide compound is defined by the formula where each φ is independently an aryl group.

3. The method of claim 2, where at least one aryl group is selected from the group consisting of phenyl, substituted phenyl, biphenyl, substituted biphenyl, heterocyclic aryl, substituted heterocyclic aryl, bicyclic aryl, substituted bicyclic aryl, polycyclic aryl, and substituted polycyclic aryl groups.

4. The method of claim 3, where the at least one aryl group is a substituted phenyl group selected from the group consisting of 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl.

5. The method of claim 3, where the at least one aryl group is a heterocyclic aryl group selected from the group consisting of 2-thienyl, 3-thienyl, 2-furyl, 3-furyl, N-methyl-2-pyrrolyl, N-methyl-3-pyrrolyl, N-methyl-2-imidazolyl, 1-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, and 2-triazinyl groups.

6. The method of claim 3, where the at least one aryl group is a bicyclic or polycyclic aryl group selected from the group consisting of 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl.

7. The method of claim 1, where the hydrobenzamide compound is selected from the group consisting of benzaldehyde hydrobenzamide, 1-naphthaldehyde hydrobenzamide, 2-naphthaldehyde hydrobenzamide, 9-anthracenecarboxaldehyde hydrobenzamide, 9-phenanthrenecarboxaldehyde hydrobenzamide, 2-pyridinecarboxaldehyde hydrobenzamide, 3-furancarboxaldehyde hydrobenzamide, N-methyl-4-pyrazolecarboxaldehyde hydrobenzamide, N-methyl-2-pyrrolecarboxaldehyde hydrobenzamide, N-methyl-2-imidazolecarboxaldehyde hydrobenzamide, N-methyl-indole-3-carboxaldehyde hydrobenzamide, N-methyl-1,2,3-triazole-4-carboxaldehyde hydrobenzamide, N-methyl-1,2,4-triazole-3-carboxaldehyde hydrobenzamide, 2-furancarboxaldehyde hydrobenzamide, pyrhydrobenzamidecarboxaldehyde hydrobenzamide, 2-thiazolecarboxaldehyde hydrobenzamide, 2-thiophenecarboxaldehyde hydrobenzamide, 2-methylbenzaldehyde hydrobenzamide, 2,3-dimethylbenzaldehyde hydrobenzamide, 2,4,6-trimethylbenzaldehyde hydrobenzamide, 2-thianthrenecarboxaldehyde hydrobenzamide, 1-isobenzofuranecarboxaldehyde hydrobenzamide, N-methyl-2-indolecarboxaldehyde hydrobenzamide, N-methyl-8-purinecarboxaldehyde hydrobenzamide, isothiazolecarboxaldehyde hydrobenzamide, 3-isoxazolecarboxaldehyde hydrobenzamide, and mixtures thereof.

8. The method of claim 1, where the hydrobenzamide compound is benzaldehyde hydrobenzamide.

9. The method of claim 1, where said step of reacting the reactive polymer with a hydrobenzamide compound takes place within a solvent.

10. The method of claim 1, where the hydrobenzamide compound is the product of reaction between ammonia and an aromatic aldehyde.

11. The method of claim 10, where the hydrobenzamide compound is the product of reaction between two moles of ammonia and three moles of aromatic aldehyde.

12. The method of claim 1, where the molar ratio of the hydrobenzamide compound to the lanthanide metal of the lanthanide-based catalyst is from about 1:1 to about 200:1.

13. The method of claim 1, where the molar ratio of the hydrobenzamide compound to the lanthanide metal of the lanthanide-based catalyst is from about 5:1 to about 150:1.

14. The method of claim 1, where the lanthanide-based catalyst is formed by combining a lanthanide compound, an alkylating agent, and optionally a halogen-containing compound, with the proviso that the lanthanide compound or the alkylating agent include a labile halogen atom in the absence of the optional halogen-containing compound.

15. The method of claim 1, where said step of reacting the reactive polymer with a hydrobenzamide compound occurs before the reactive polymer is quenched.

16. The method of claim 14, where the alkylating agent includes an aluminoxane and an organoaluminum compound represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

* * * * *